(12) United States Patent
Meschke et al.

(10) Patent No.: US 12,565,904 B2
(45) Date of Patent: Mar. 3, 2026

(54) FIELD DEVICE MOUNT

(71) Applicant: Rosemount Inc., Shakopee, MN (US)

(72) Inventors: Timothy R. Meschke, Carver, MN (US); Nathan S. Loya, Cologne, MN (US); Jeffrey A. Cota, Rosemount, MN (US); Meagan C. Dobratz, Carver, MN (US)

(73) Assignee: Rosemount Inc., Shakopee, MN (US)

( * ) Notice: Subject to any disclaimer, the term of this patent is extended or adjusted under 35 U.S.C. 154(b) by 0 days.

(21) Appl. No.: 18/490,263

(22) Filed: Oct. 19, 2023

(65) Prior Publication Data

US 2024/0133404 A1    Apr. 25, 2024
US 2024/0229837 A9    Jul. 11, 2024

Related U.S. Application Data

(60) Provisional application No. 63/418,131, filed on Oct. 21, 2022.

(51) Int. Cl.
F16B 2/08        (2006.01)
(52) U.S. Cl.
CPC ...................................... F16B 2/08 (2013.01)
(58) Field of Classification Search
CPC ................ F16B 2/08; F16L 3/137; F16L 3/14
USPC .................... 248/74.3, 218.4–219.4; 24/278; 285/197, 93; 269/130–132; 81/3.43, 65, 81/170; 294/119.2
See application file for complete search history.

(56) References Cited

U.S. PATENT DOCUMENTS

| 193,946 | A | * | 8/1877 | Hamilton | ............... B65D 63/08 403/396 |
| 775,581 | A | * | 11/1904 | Rothenbucher | ......... B25B 13/52 30/100 |
| 2,392,210 | A | * | 1/1946 | Zaleske | ................... F16L 33/10 269/132 |
| 2,427,353 | A | * | 9/1947 | Gagesteyn | ............. B25B 1/205 81/3.43 |

(Continued)

FOREIGN PATENT DOCUMENTS

| EP | 0666444 B1 | 4/1997 |
| JP | 2022118958 A | 8/2022 |
| KR | 20110052076 A | 5/2011 |

OTHER PUBLICATIONS

International Search Report & Written Opinion for PCT Application No. PCT/US2023/077270, Dated Feb. 14, 2024, 14 pages.

*Primary Examiner* — Christopher Garft
(74) *Attorney, Agent, or Firm* — Christopher R. Christenson; Kelly, Holt & Christenson, P.L.L.C.

(57) ABSTRACT

A field device mount includes a union configured to couple to a field device. A clamp foot is coupled to the union and is configured to engage fluid handling equipment. A tensioner assembly is coupled to the clamp foot and includes a tensioner bracket. A biasing member is disposed to urge the tensioner bracket away from the clamp foot. A band is configured to pass around the fluid handling equipment and to couple to opposite sides of the tensioner bracket. A buckle is configured to provide clamping force to maintain tension in the band. A field device mount using inline tensioners or a v-bolt as well as a method of coupling a field device mount to fluid handling equipment are also provided.

7 Claims, 21 Drawing Sheets

(56) References Cited

U.S. PATENT DOCUMENTS

| | | | | | |
|---|---|---|---|---|---|
| 2,522,190 | A | * | 9/1950 | Mouser | B25B 13/52 |
| | | | | | 294/119.2 |
| 4,761,024 | A | * | 8/1988 | Ewen | B29C 66/9241 |
| | | | | | 137/318 |
| 8,186,643 | B2 | * | 5/2012 | Luo | F16L 41/008 |
| | | | | | 248/230.8 |
| 2006/0090570 | A1 | * | 5/2006 | Wiest | G01F 1/662 |
| | | | | | 73/824 |
| 2011/0233377 | A1 | * | 9/2011 | Luo | F16L 41/008 |
| | | | | | 248/689 |
| 2013/0105639 | A1 | * | 5/2013 | Chirpich | F16L 3/137 |
| | | | | | 248/74.3 |
| 2018/0266617 | A1 | | 9/2018 | Yoon et al. | |

* cited by examiner

FIELD DEVICE MOUNT

CROSS-REFERENCE TO RELATED APPLICATION

The present application is based on and claims the benefit of U.S. Provisional Patent Application Ser. No. 63/418,131, filed Oct. 21, 2022, the content of which provisional application is hereby incorporated by reference in its entirety.

BACKGROUND

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices used in the measurement, control and monitoring of industrial processes.

Field devices are used by the process control and measurement industry for a variety of purposes. Usually, such devices have a field-hardened enclosure so that they can be installed outdoors in relatively rugged environments and are able to withstand climatological extremes of temperature, humidity, vibration, mechanical shock, et cetera. These devices also can typically operate on relatively low power. For example, field devices are currently available that receive all of their operating power from a known 4-20 mA loop.

There are a number of different types of field devices. Such devices include process variable transmitters that include or are coupled to a process variable sensor and provide an indication of the process variable to the control system. Field devices also include actuators, such as valve controllers and positioners that are able to generate a physical output (i.e., position of a member) based on a signal received from the control system. Field devices also include gauges or displays that may be mounted at key locations in the process environment to indicate process variables or conditions. Field devices also include sensor assemblies mounted to process piping, tanks, or vessels, herein referred to as fluid handling equipment, and electrically coupled to process variable transmitters.

Field devices are often mounted to the process installation (e.g., process pipes) to which they are coupled. Such mounting presents some challenges as the fluid handling equipment (pipes or vessels) may experience a wide variation in temperature as well as mechanical vibration. However, a field device mount needs to robustly maintain its mounting location even under such conditions.

SUMMARY

A field device mount includes a union configured to couple to a field device. A clamp foot is coupled to the union and is configured to engage fluid handling equipment. A tensioner assembly is coupled to the clamp foot and includes a tensioner bracket. A biasing member is disposed to urge the tensioner bracket away from the clamp foot. A band is configured to pass around the fluid handling equipment and to couple to opposite sides of the tensioner bracket. A buckle is configured to provide clamping force to maintain tension in the band. A field device mount using inline tensioners as well as a method of coupling a field device mount to fluid handling equipment are also provided.

DETAILED DESCRIPTION OF ILLUSTRATIVE EMBODIMENTS

Embodiments described herein generally leverage a known process called banding in which a relatively thin strip of material can be encircled about an object or objects to be banded, and then tensioned, clamped, and cut to hold the objects in the banded position. Leveraging this banding process in order to mount a field device to process piping provides significant improvements over previous approaches. Where previously a unique saddle clamp size would be required for each different pipe size, now a piece of banding may simply be cut to length depending upon the pipe size for which the field device mount is to be used. This allows manufacturing to stock spools of banding material, which may simply be cut to length once a field device mount has been ordered. The banding process also allows for removable installation of a field device mount around a tank or vessel, which is an improvement over the previous attachment method of welding.

In order to tension the banding, known banding tensioner tools can be used. Typically, a buckle is first attached onto the banding, and the banding is then wrapped around the fluid handling equipment and through the buckle. In the case of the field device mount in accordance with an embodiment described herein, the banding is instead wrapped through the tensioner bracket, otherwise operation of the banding is substantially the same as a typical banding process. The tensioner tool pulls the loose end of the band tight and the buckle secures the band.

In order to accommodate temperature ranges for the field device mount, different banding materials may be used to accommodate application needs.

In recent years, the use of surface-mounted (i.e., mounted to an external surface of fluid handling equipment, such as a pipe or vessel) temperature measurement devices have become a popular alternative to direct temperature measurement methods (e.g., traditional thermowell). These surface-mounted devices can provide a non-intrusive measurement point which measures the external temperature of the pipe or vessel surface.

Figure 1:
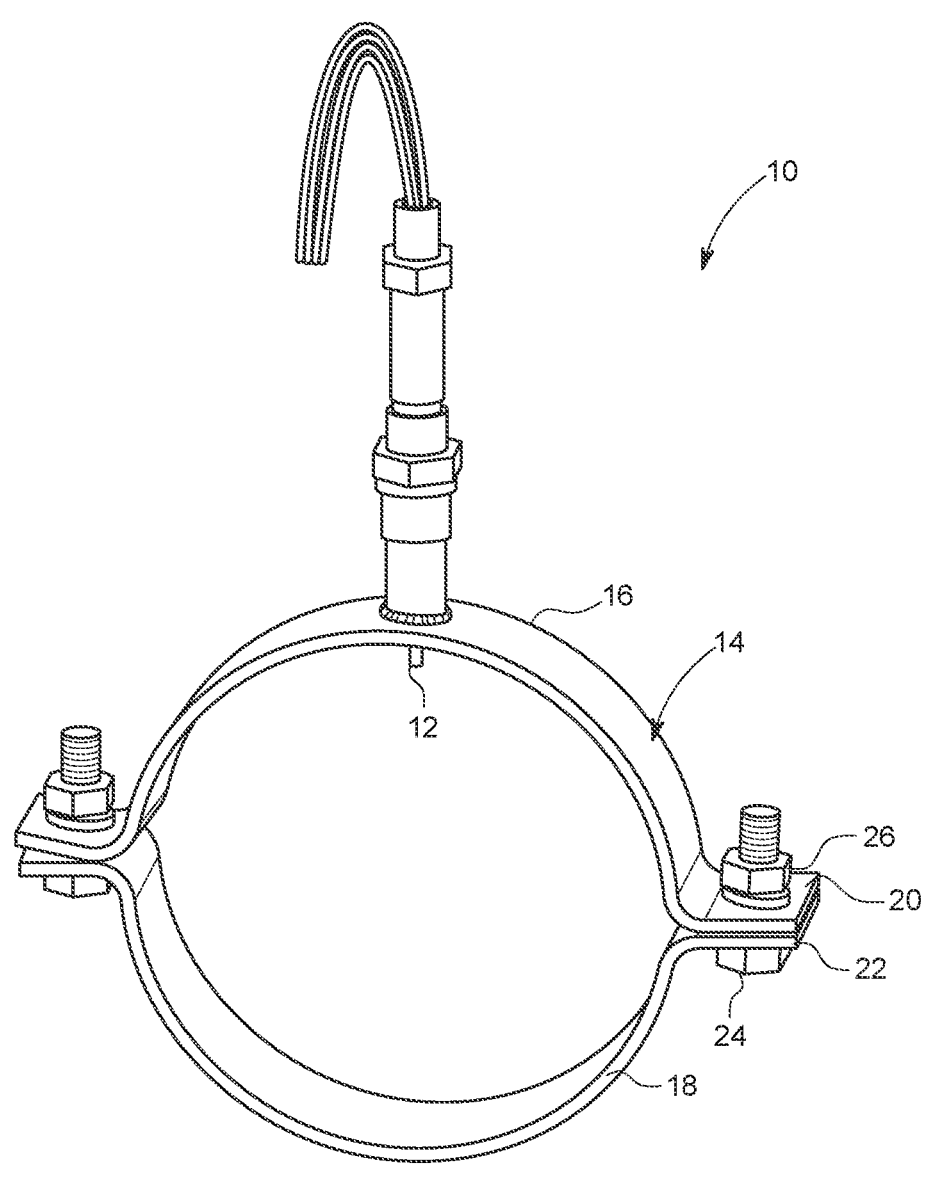
FIG. 1 is a diagrammatic view of a prior art mount.

FIG. 1 is a diagrammatic view of a measurement system using a prior art mount. A temperature measurement device 12 is spring-loaded and configured to contact an external diameter of a pipe surface that is held within pipe mount 14. As shown, pipe mount 14 includes a pair of semicircular saddle clamps 16, 18 each having respective ears 20, 22 that are urged together by fastening hardware, such as a bolt 24 and nut 26. As can be appreciated, the curvature of each semicircular saddle clamp 16, 18 closely approximates the outer diameter of the pipe to which it will be mounted. Accordingly, for system 10 to be compatible with various process installations and pipes having different diameters, many sizes of saddle clamps must be manufactured and stocked. Although this solution provides a strong connection to the pipe, it generally has a relatively high cost and requires a different saddle clamp size for every pipe size. This creates business and customer challenges for inventory, shipping, and installation of the clamp. As the saddle clamps increase in size to support large diameter fluid handling equipment, environmental impact of shipping the pipe mount to the customer increases along with the safety risk during manufacturing and installation.

In accordance with various embodiments set forth below, a field device mount is provided that is adaptable to fluid handling equipment size and does not require a different clamp for each different pipe, vessel, or equipment size. Further, embodiments described herein are able to compensate for small changes in diameter that occur during temperature changes via thermal expansion and/or contraction. This helps ensure that a robust mount is provided regardless of differences in thermal expansion between the fluid handling equipment and the clamping system.

While the pipe mount design illustrated with respect to FIG. 1 provides a rigid connection around the outside of the pipe, it can sometimes be susceptible to the effects of differential thermal expansion/contraction and/or vibration.

Figure 2:
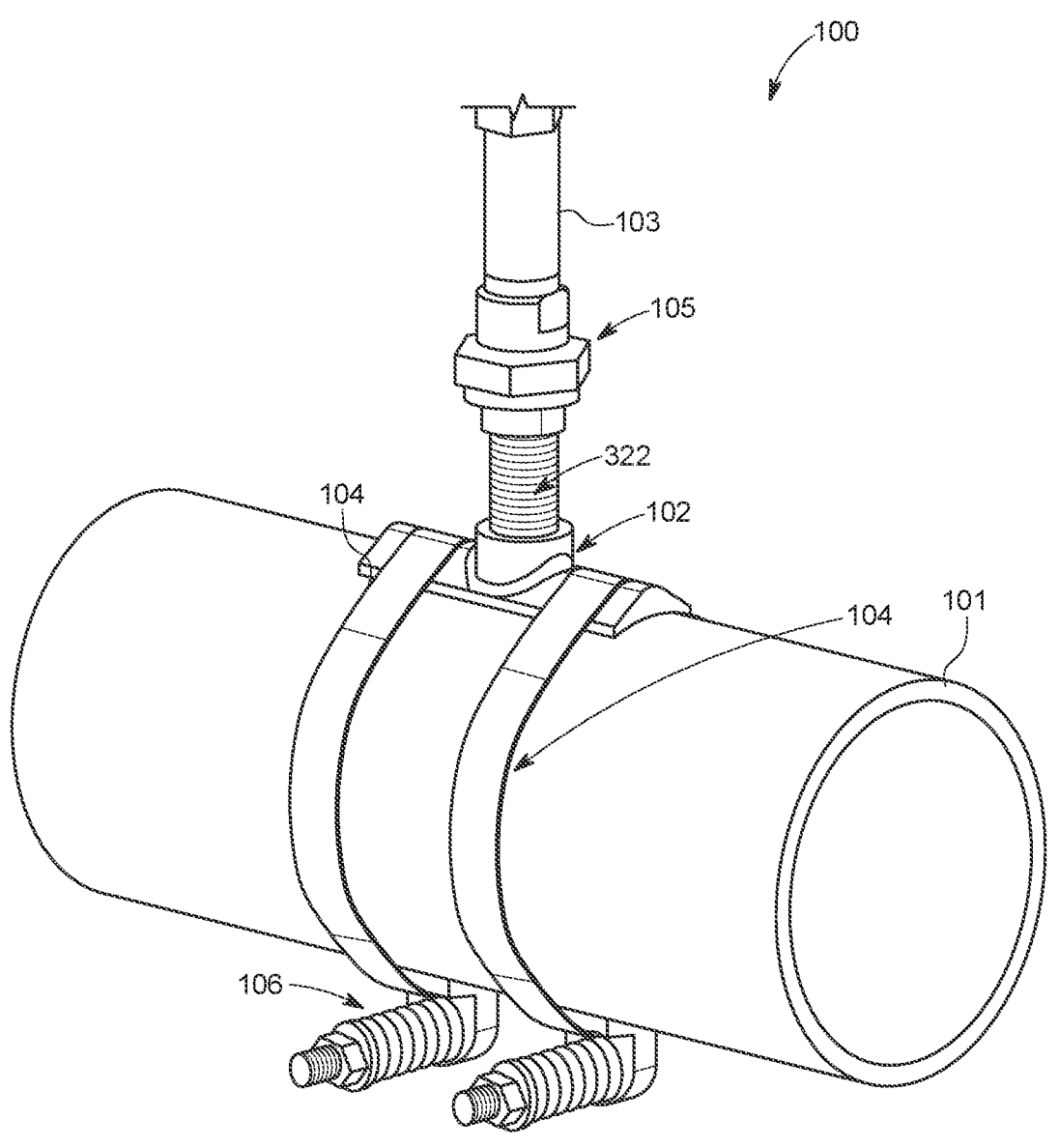
FIG. 2 is a diagrammatic view of a field device mount in accordance with an embodiment of the present invention.

FIG. 2 is a diagrammatic view of a field device mount in accordance with an embodiment of the present invention. In order to provide a solution which can be used on a wide range of fluid handling equipment sizes and materials, the field device mount set forth in FIG. 2 employs a clamp foot 102, flexible banding 104, and inline tension-retaining features 106. The combination of flexible banding 104 and tension-retaining features 106 means that the field device can maintain sufficient clamping force despite changes caused by thermal expansion or contraction. Field device mount 100 allows for multiple methods of attachment to fluid handling equipment 101. FIG. 2 illustrates a dual-band configuration with inline tensioners 106 in accordance with a first embodiment. As shown, the bands 104 wrap over the top of clamp foot 102 around fluid handling equipment 101. Field device mount 100 includes union 105 that is internally threaded to receive a field device. In the illustrated example, a spring-loaded sensor adapter 103 is threaded into union 105 in order to position a spring-loaded temperature sensor against the outside surface of fluid handling equipment 101. Spring-loaded sensor adapter 103 preferably provides a flameproof/explosion proof barrier. The union extension includes union 105 and stem 322, which assembles into clamp foot 102.

Figure 3:
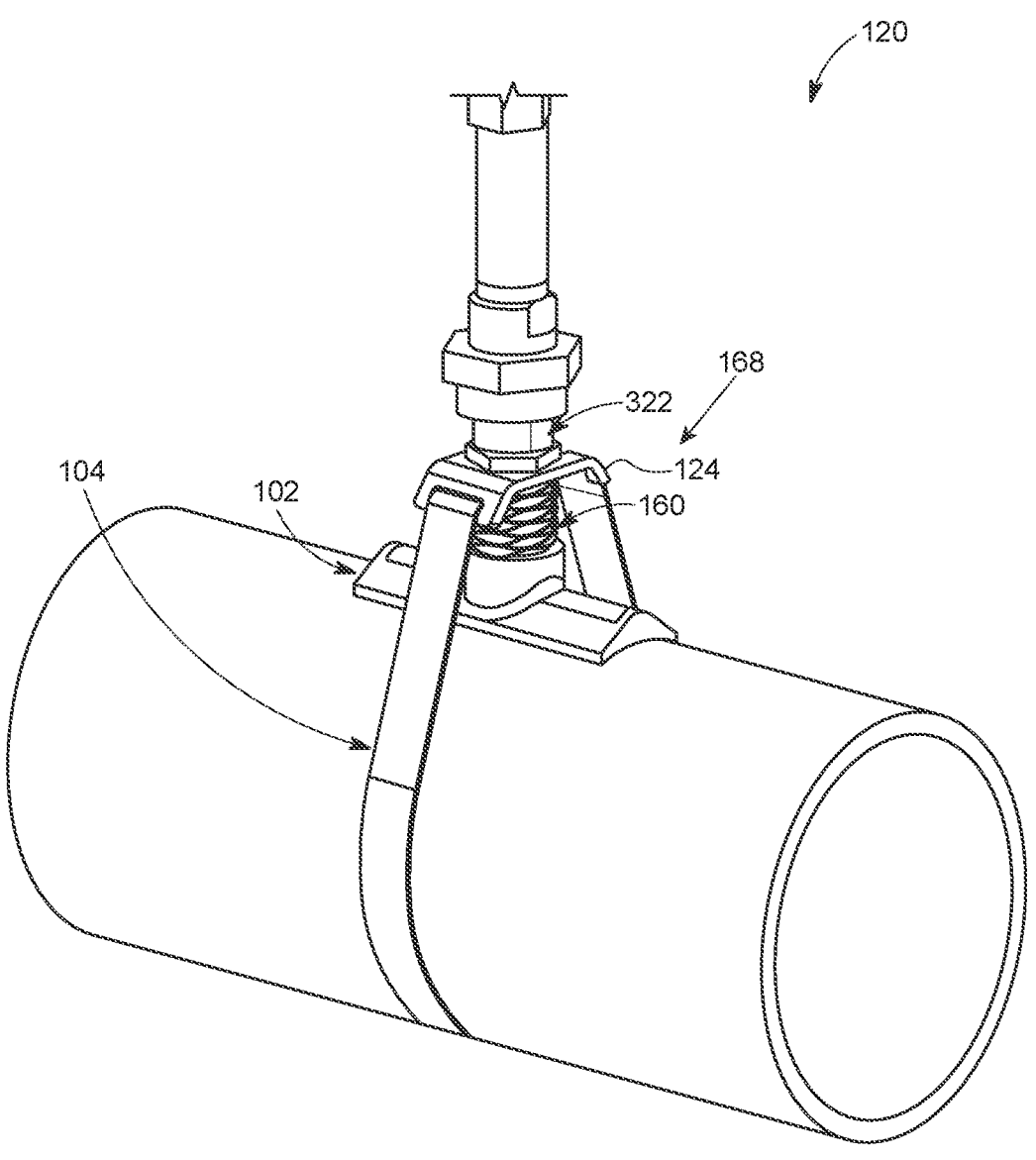
FIG. 3 is a diagrammatic view of a field device mount in accordance with another embodiment of the present invention.

FIG. 3 is a diagrammatic view of a field device mount in accordance with another embodiment of the present invention. As shown in FIG. 3, field device mount 120 continues to employ clamp foot 102, but only has a single band 104. This single band configuration utilizes a single compression spring (e.g., wave spring) 160, piloted by a central shaft, stem 322, of the union extension. In this example, a buckle or any other suitable structure may be used for the banding. In this embodiment, banding 104 is affixed to a tensioner bracket 124 along the central shaft, which compresses spring 160 as banding 104 is tightened to secure the field device mount.

Figure 4:
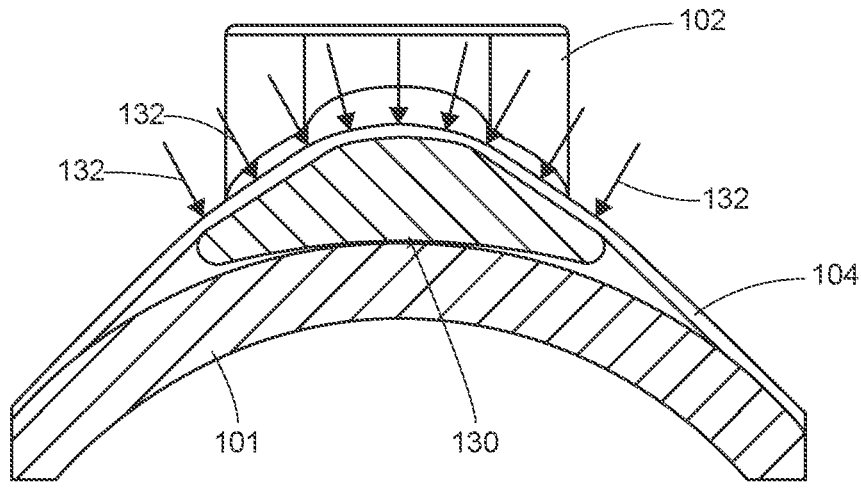
FIG. 4 is a diagrammatic cross-sectional view of a clamp foot in accordance with an embodiment of the present invention.

FIG. 4 is a diagrammatic cross-sectional view of a clamp foot in accordance with an embodiment of the present invention. The primary contact component of the field device mount in accordance with various embodiments described herein is referred to as the clamp foot 102 which holds the field device substantially perpendicular to fluid handling equipment 101 (both axially and radially) and interfaces with the surface of fluid handling equipment 101. Clamp foot 102 generally has a chevron-shaped profile which provides a number of benefits over a flat-top design. On the contact surface of clamp foot 102 is a v-groove 130 which is created to provide the highest stability for the largest range of fluid handling equipment sizes. In one particular embodiment, v-groove 130 has an angle of about 160°. The top profile allows for an even distribution of forces, illustrated diagrammatically at arrows 132, across the surface of clamp foot 102 when banding 104 is tensioned in order to avoid high stress concentrations. Compared to a clamp foot with a flat top, the clamp foot 102 allows banding 104 to contact the entire surface of clamp foot 102 thereby distributing the stresses over the outer surface of clamp foot 102.

Figure 5A:
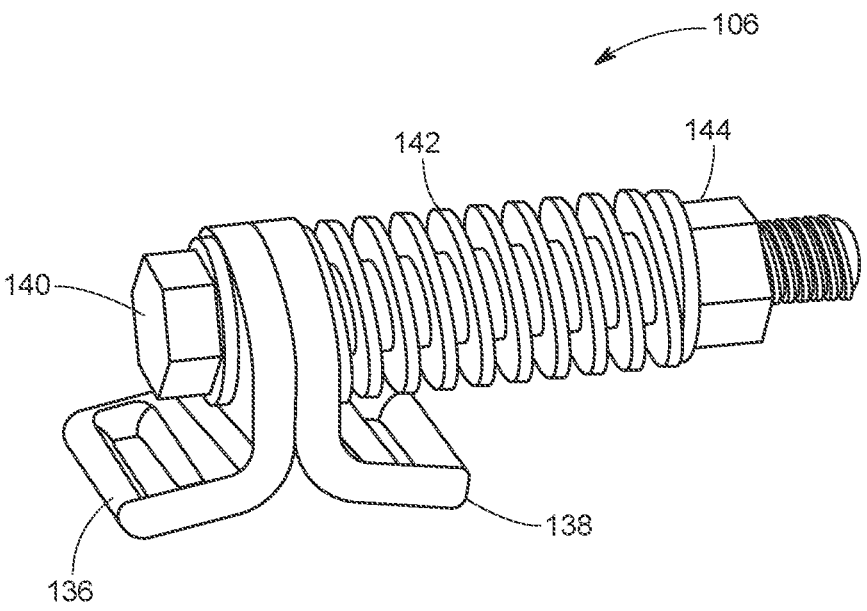
FIG. 5A is a diagrammatic view of an inline tensioner assembly in accordance with an embodiment of the present invention in a relaxed state.

FIG. 5A is a diagrammatic view showing an inline tensioner assembly in greater detail. As illustrated, inline tensioner assembly 106 generally includes a pair of band-engaging elements 136, 138 each being configured to allow fastener 140 to pass therethrough. A compression spring 142 is disposed about fastener 140 and is captured between band-engaging portion 138 and nut 144. As nut 144 is rotated, compression spring 142 will change compression.

Figure 5B:
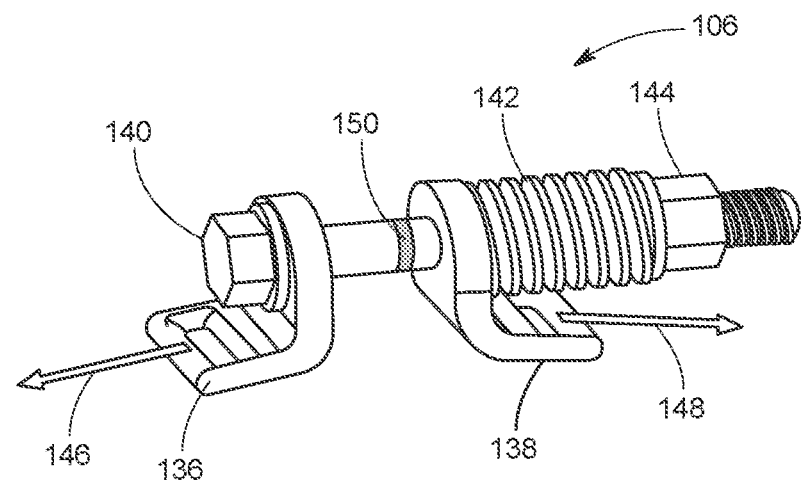
FIG. 5B is a diagrammatic view of an inline tensioner assembly in accordance with an embodiment of the present invention in a tensioned state.

FIG. 5B is a diagrammatic view of inline tensioner assembly 106 in a tensioned state. As shown in FIG. 5B, as the bands (not shown) exert forces in the directions 146, 148 band engaging portions 136 and 138 are pulled apart against the bias of compression spring 142. Should any changes in the diameter of the fluid handling equipment occur (such as caused by thermal expansion or contraction) the distance between band-engaging portions 136, 138 will change accordingly and maintain substantially the same tension by virtue of the bias of compression spring 142. To properly set tensioner assembly 106, end users will generally tension the banding until compression spring 142 has been compressed by a predetermined distance. This distance can either be denoted by a physical marking on the tensioner, for example represented by a mark 150 on fastener 140 or via installation manuals. For uninstallation of the field device mount, the inline tensioner nut 144 is slowly unscrewed from fastener 140, which will gradually deenergize compression spring 142 and remove all potential energy in inline tensioner 106. Once the compression spring 142 has been deenergized, banding (not shown) may be safely removed from field device mount 100.

Figure 6A:
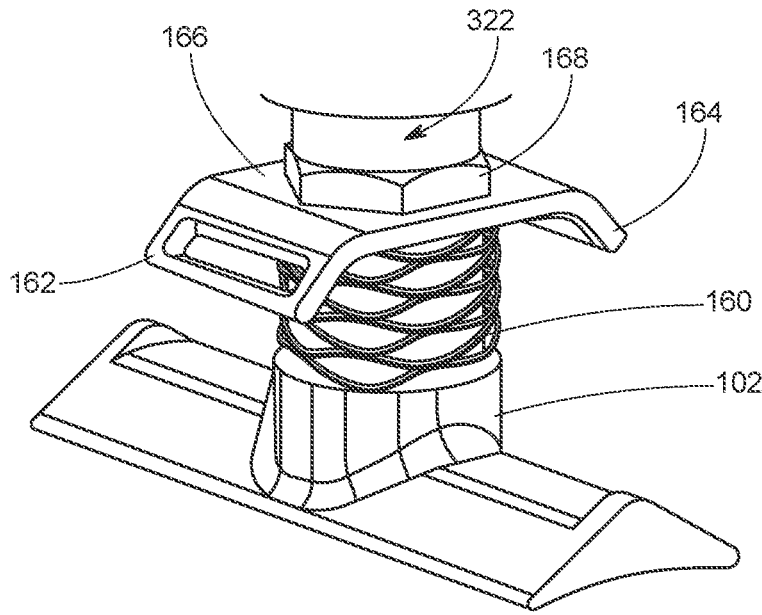
FIG. 6A is a diagrammatic view of a clamp foot in combination with a perpendicular tension assembly in accordance with an embodiment of the present invention in a relaxed state.
Figure 6B:
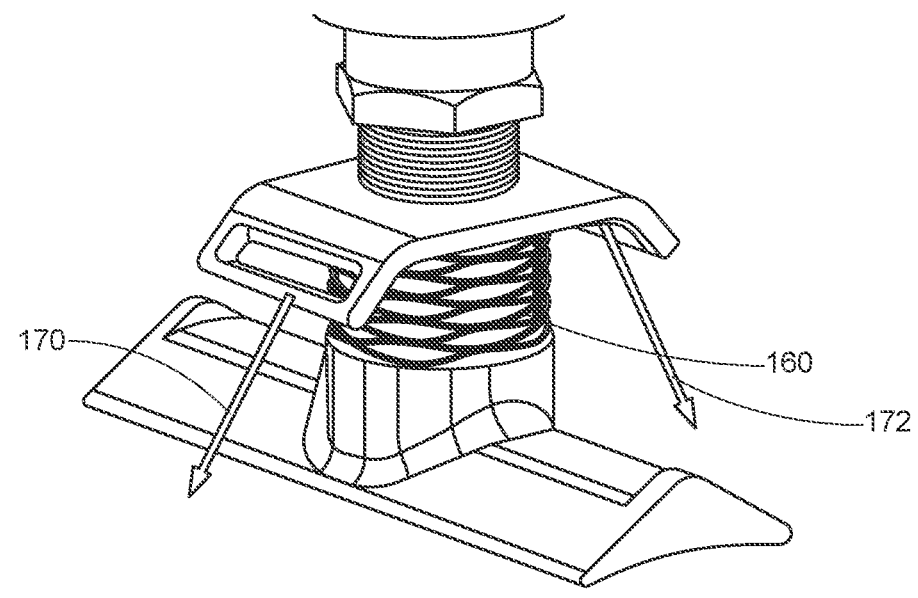
FIG. 6B is a diagrammatic view of a clamp foot in combination with a perpendicular tensioner assembly in accordance with an embodiment of the present invention in a compressed state.

FIG. 6A is a diagrammatic view of a clamp foot 102 in combination with a perpendicular tensioner assembly in accordance with an embodiment of the present invention. For single-banded mounting applications (such as shown in FIG. 3), a single compression spring 160 is used, which pilots along the stem 322 of the union extension. The banding 104 (not shown) loops around band-engaging portions 162, 164 on tensioner bracket 166 which pilots on the central shaft on top of compression spring 160. As banding 104 is tensioned, compression spring 160 becomes compressed, and the clamping load is equivalent to the spring force applied to clamp foot 102. Like the inline tensioner assembly 106, banding 104 is tensioned until compression spring 160 has been compressed a predetermined distance, preferably denoted by a physical mark or measurement provided to the user. For uninstallation of this assembly, jamb nut 168, located on the central shaft, is tightened up against tensioner bracket 166 until spring 160 is further compressed. Compressing spring 160 further relieves tension on the banding 104 and allows for safe removal of the banding 104. Once banding 104 has been removed, jamb nut 168 can then be loosened to its original position safely decompressing and deenergizing spring 160. FIG. 6B is a diagrammatic view of the perpendicular tensioner assembly in a compressed state. Banding generates forces indicated at arrows 170, 172 against the force of compression spring 160.

Figure 7:
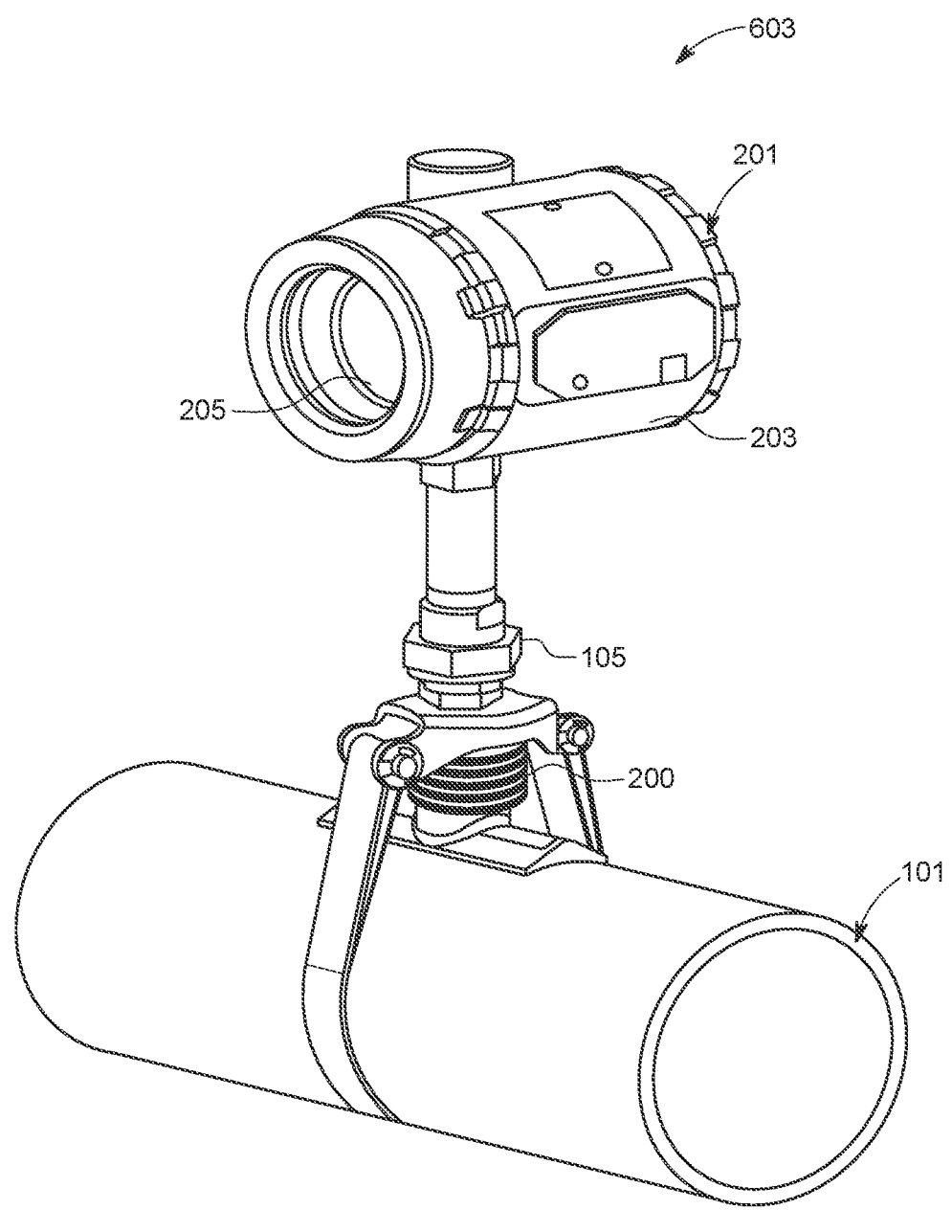
FIG. 7 is a diagrammatic view of a field device mount in accordance with another embodiment of the present invention.

FIG. 7 is a diagrammatic view of a field device mount in accordance with another embodiment of the present invention. While embodiments thus far have been described with respect to a perpendicular tensioner or an inline tensioner that uses a compression spring, other types of biasing members can be used. As shown in FIG. 7, a series of stacked disc springs 200 are used in the perpendicular single-band tensioner assembly. Since disc springs 200 of this form factor have significantly higher spring rate than a comparable wave spring or coil spring, using a series stack of disc springs may achieve both a spring force and spring travel distance great enough where it would be suitable for use for a variety of installation methods including both remote mount and integral mount (as shown) field device assemblies. A field device 201 is coupled to union 105 and includes a field-hardened enclosure 203 and a local display 205, which significantly increases the mass requiring support. The significant clamping force and effectiveness of field device mount 603, with a series of disc springs 200, compared to field device mount 120, with compression spring 160, allows field device 201 to be mounted directly to fluid handling equipment 101 instead of requiring remote installation.

Figure 8:
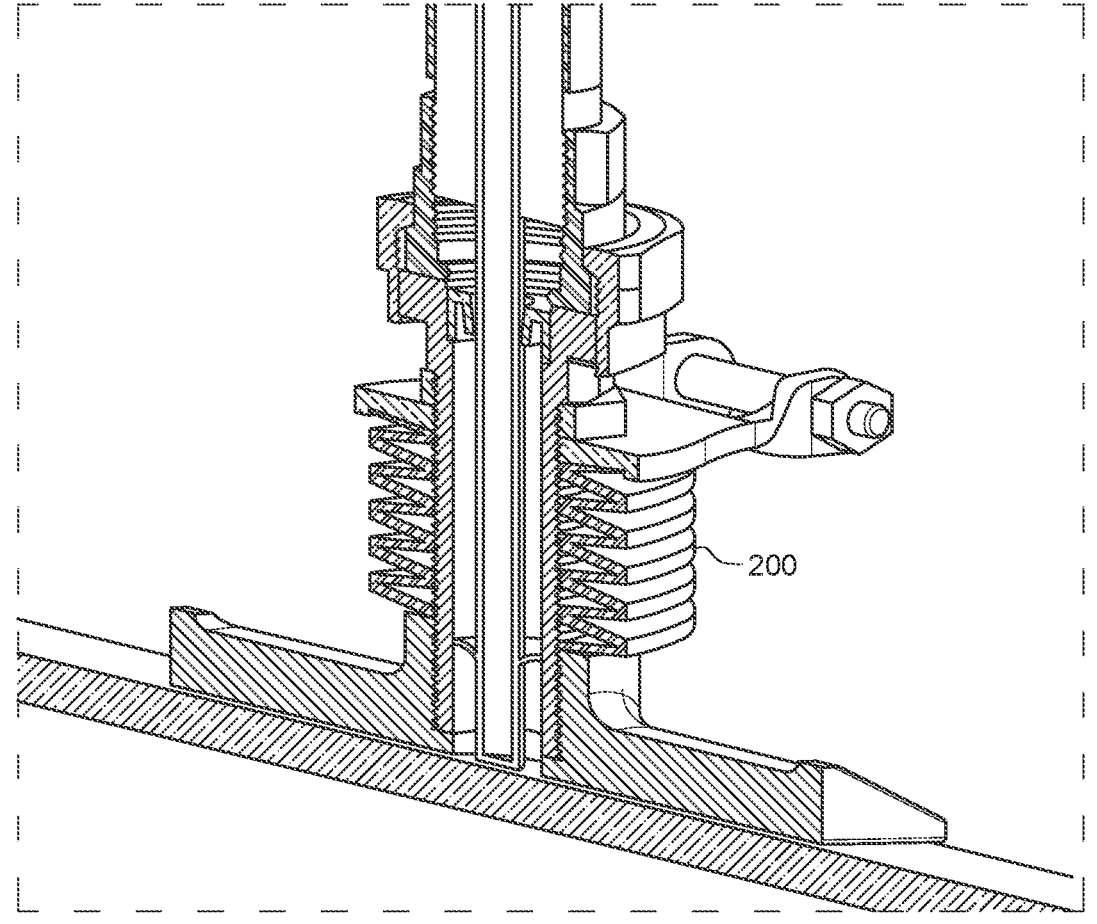
FIG. 8 is an enlarged diagrammatic cross-sectional view of a portion of a perpendicular single-band tensioner assembly in accordance with an embodiment of the present invention.

FIG. 8 is an enlarged diagrammatic cross-sectional view of a portion of the perpendicular single-band tensioner assembly shown in FIG. 7. FIG. 8 shows how washers with a conical shape are used in alternating orientation to create a disc spring assembly of arbitrary size. The conical shape gives each washer its flexible effect and when stacked together creates a high spring rate assembly.

Figures 9, 10:
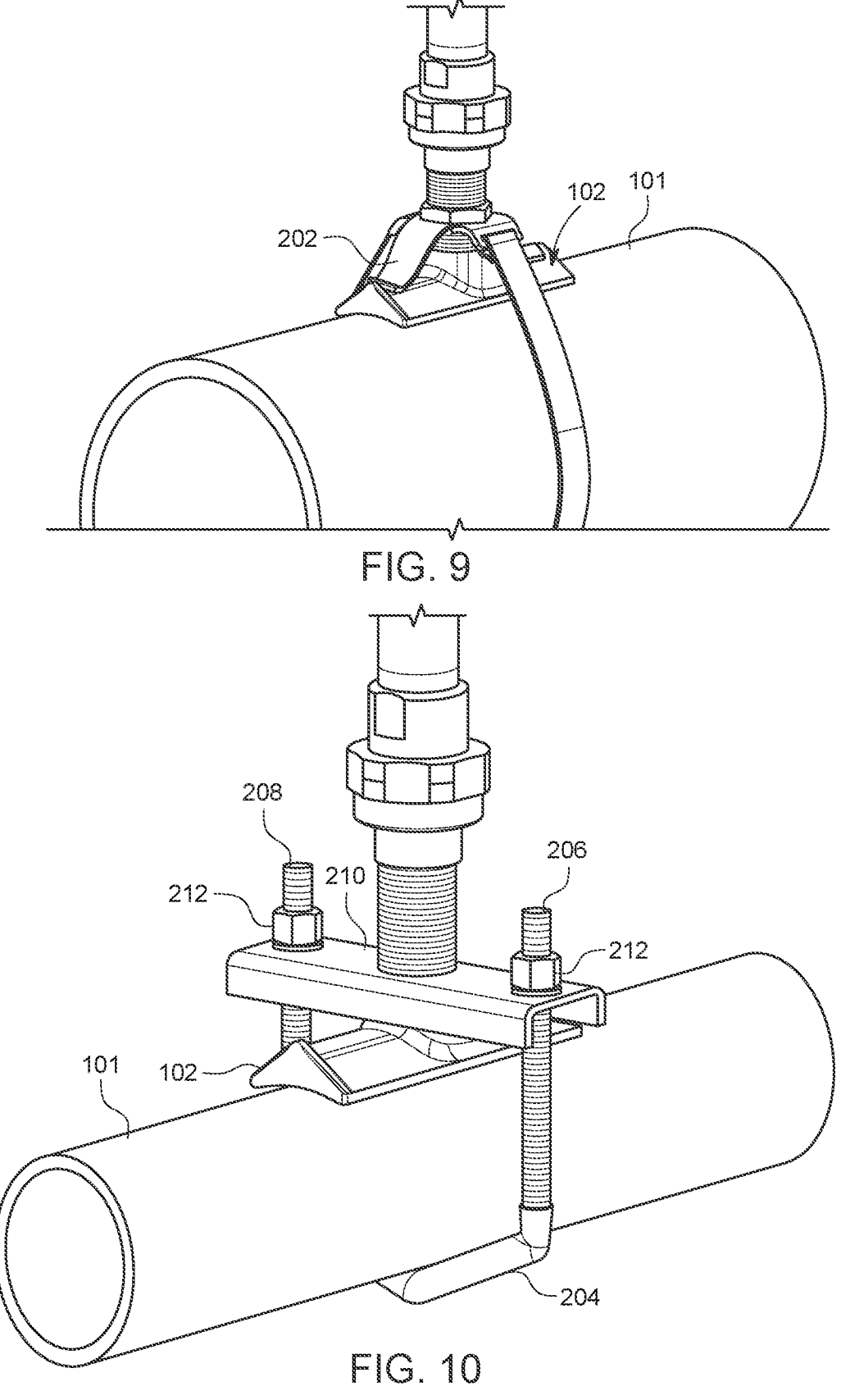
FIG. 9 is a diagrammatic view of a field device mount in accordance with another embodiment of the present invention.
FIG. 10 is a diagrammatic view of a field device mount in accordance with another embodiment of the present invention.

FIG. 9 is a diagrammatic view of a perpendicular tensioner assembly in accordance with another embodiment of the present invention. As shown in FIG. 9, the perpendicular single band tensioner assembly can also utilize a leaf spring 202 as a biasing member. Leaf spring 202 extends along clamp foot 102 and helps the field device mount resist vibrations along the axial direction of fluid handling equipment 101 while also ensuring the banding stays tensioned during expansion and contraction.

FIG. 10 is a diagrammatic view of a field device mount in accordance with another embodiment of the present invention. As an alternative method of attachment for relatively small line sizes, the clamping foot 102 is urged against fluid handling equipment 101 by v-bolt clamp 204. As shown, v-bolt clamp 204 generally has a "v" shape and a pair of threaded ends 206, 208 which pass through apertures of beam 210. Fasteners, such as nuts 212 are threaded upon ends 206, 208 in order to generate significant clamping force between clamping foot 102 and fluid handling equipment 101.

Figure 11:
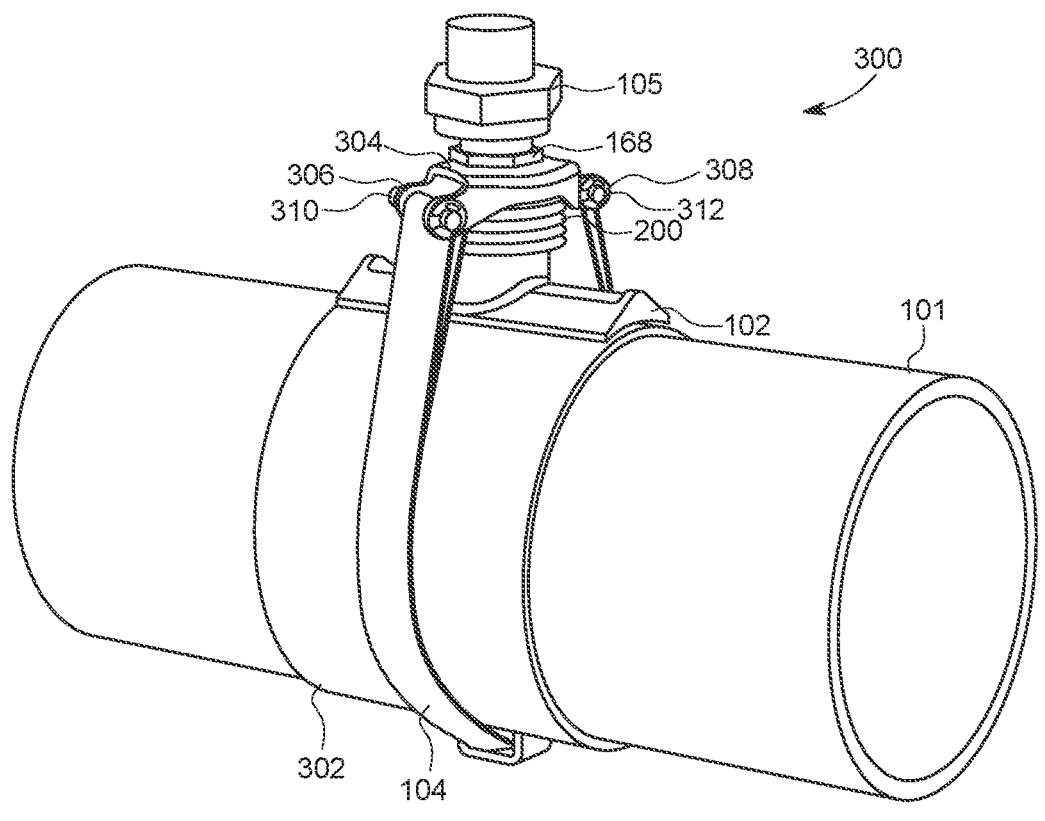
FIG. 11 is a diagrammatic view of a field device mount in accordance with another embodiment of the present invention.

FIG. 11 is a diagrammatic view of a field device mount in accordance with another embodiment of the present invention. The design illustrated with respect to FIG. 11 is similar to that shown in FIG. 3 and like components are numbered similarly. However, the embodiment shown in FIG. 11 differs from that of FIG. 3 in a number of important regards. Field device mount 300 includes an inlay 302 that is disposed between fluid handling equipment 101 and the band 104 and clamp foot 102. Inlay 302 functions as a corrosion barrier (primarily against galvanic corrosion) between the fluid handling equipment 101 and the banding 104 and clamp foot 102. Inlay 302 includes a cutout for the sensor as well as optional holding tabs that attach together to hold the inlay in place. Field device mount 300 also includes a jamb nut 168 and stacked disc springs 200 as an improvement over compression spring 160 in FIG. 3. As shown in FIG. 11, field device mount 300 utilizes a modified tensioner bracket 304 with a pair of ears 306, 308 that are configured to receive respective removable pins (e.g., clevis pins) 310, 312. As banding 104 is tensioned, tensioner bracket 304 translates the force to disc springs 200 until proper installation tension is achieved. Removable pins 310, 312 allow for band rotation, and are retained by fasteners, such as c-clips (shown in FIG. 13) to hold pins 310, 312 to tensioner bracket 304, but also allow safe removal and re-use.

Figure 12:
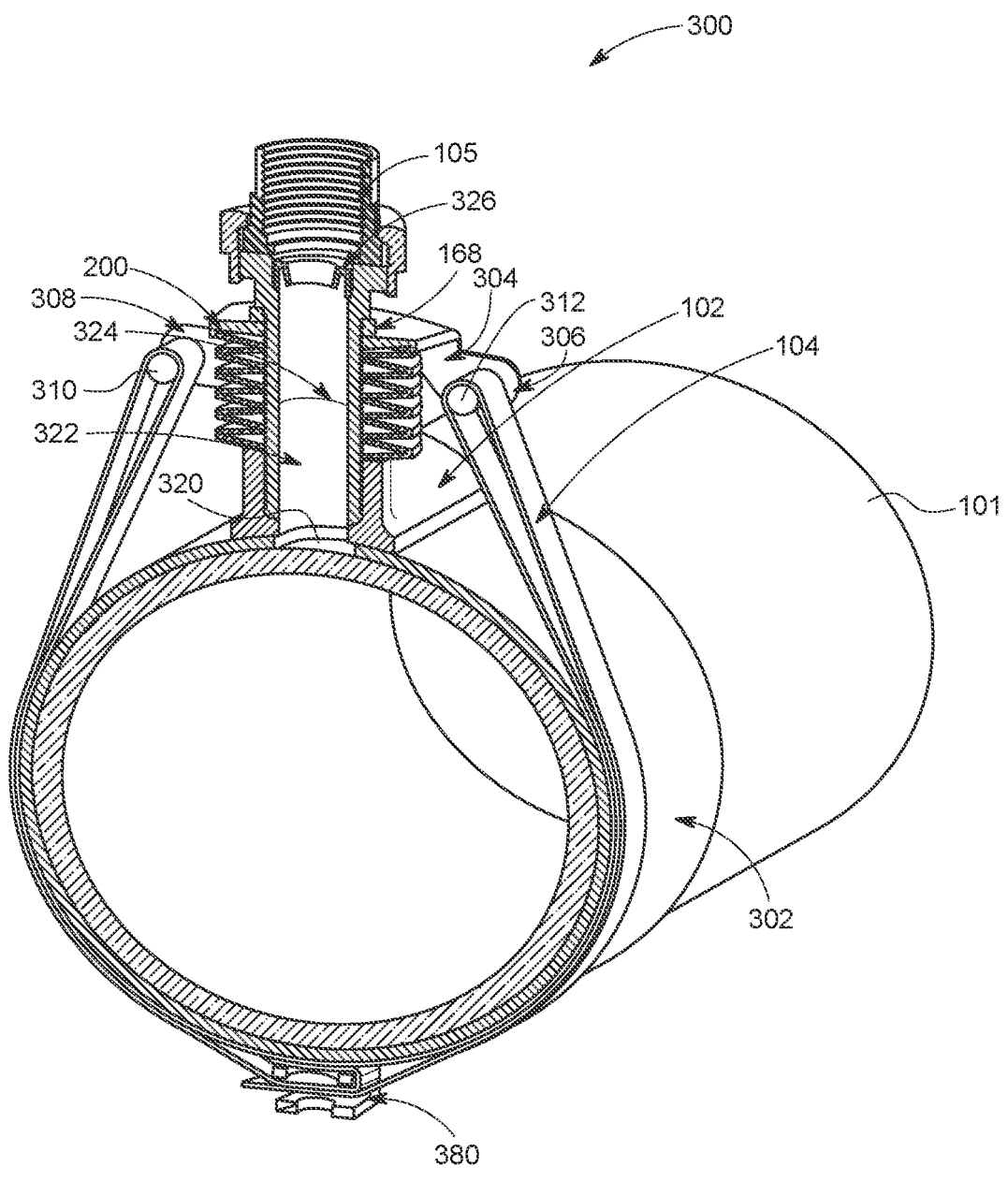
FIG. 12 is a cross-sectional view of the field device mount shown in FIG. 11.

FIG. 12 is a cross-sectional view of field device mount 300 shown in FIG. 11. As shown, inlay 302 includes a gap 320 proximate to stem 322. Additionally, stem 322 also includes a centering feature 324 that is configured to ensure a temperature sensor inserted into the mounting assembly is centered within stem 322 and thus achieves substantially perpendicular contact to the outer surface of fluid handling equipment 101. This perpendicular contact is important to ensure an accurate temperature measurement. As can be seen in FIG. 12, a seal 326 is provided within union 105 to prevent ingress into field device 201 (not pictured).

As shown in FIGS. 11 and 12, modified tensioner bracket 304 provides significant robustness as well as helps locate the spring edge. Further, the tensioner bracket 304 also includes ears 306, 308 for removable pins 310, 312. Tensioner bracket 304 has a substantially flat underside for disc spring contact, and includes sides formed as a locating feature around the first set of washers within the stack of disc springs 200. Parallel ears 306, 308 have holes for removable pins 310, 312 that hold the banding to tensioner bracket 304.

Figure 13:
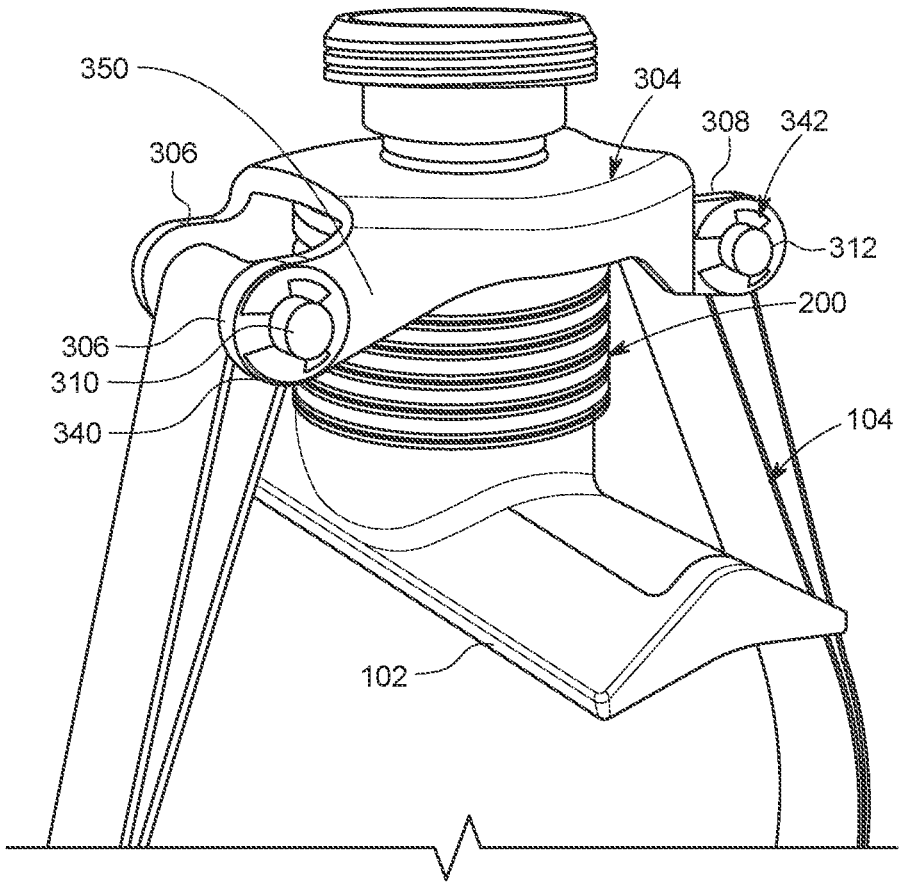
FIG. 13 is a diagrammatic view of a clamp foot being tensioned in a perpendicular tensioning assembly in accordance with an embodiment of the present invention.

FIG. 13 is a diagrammatic perspective view of a clamp foot 102 being tensioned in a perpendicular tensioner assembly in accordance with an embodiment of the present invention. As shown in FIG. 13, a pair of parallel ears 306, 308 are configured to receive removable pins 310, 312, which are held in place by fasteners 340, 342. Also shown in FIG. 13, tensioner bracket 304 includes a pair of opposed side walls 350 that extend downwardly about the external diameter of disc springs 200.

Figure 14:
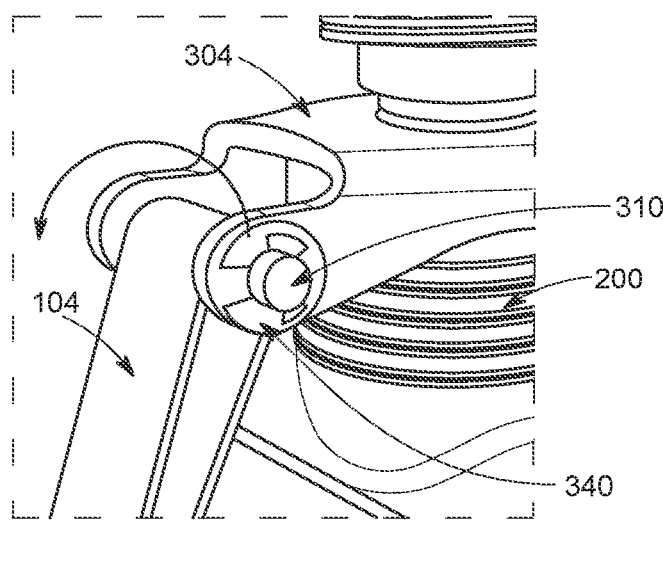
FIG. 14 is a diagrammatic view illustrating pin rotation during installation.

FIG. 14 is a diagrammatic view illustrating pin rotation during installation. As shown, the banding 104 is doubled over the pins and then pulled together in buckle 380 (shown in FIG. 12). As banding 104 is tensioned, each side is pulled, and the removable pins 310, 312 are allowed to rotate within the tensioner bracket 304. This allows for the banding 104 to rotate about the removable pins 310, 312 thereby resulting in uniform tension being applied to the tensioner bracket 304 and the disc springs 200.

Figure 15:
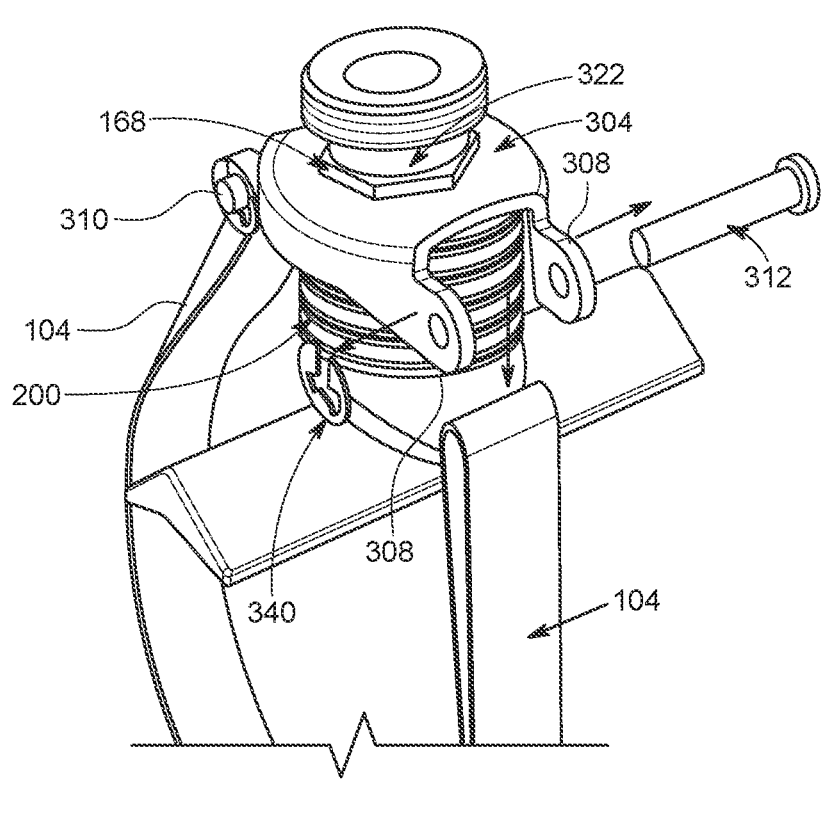
FIG. 15 is an unassembled view of a field device mount in accordance with an embodiment of the present invention.

FIG. 15 is an unassembled view of a field device mount in accordance with an embodiment of the present invention. As shown in FIG. 15, pin 310 is engaged with banding 104. However, banding 104 is not yet engaged with removable pin 312. Banding 104 includes a loop that is passed between ears 308 while removable pin 312 is also passed through ears 308 and the loop of band 104. Then, fastener 340 is engaged upon removable pin 312 to maintain removable pin 312 in its mounted position. The removable pins allow for safe removal of the banding and the field device mount. Pin and banding removal is performed by threading down the tension nut 168 and removing the retaining fastener 340 and removable pin 312 from the tensioner bracket 304. Tension nut 168 is threaded down stem 322, thereby further compressing the disc springs 200 underneath tensioner bracket 304. The additional spring compression de-tensions banding 104 and allows the assembly to move freely for safe removal. Being able to remove the banding after installation provides significant value to the end user as the end user does not have to fully disassemble or require new banding to move the unit. The assembly can then be reinstalled in an alternate location with minimal installation time and effort. For reinstallation, after the banding is positioned around the pipe, the pin and retaining fastener are simply reinserted into tensioner bracket 304 and tension nut 168 is threaded back to the top of the stem 322 thereby releasing the additional spring tension and transferring it back to the banding, holding the field device mount as initially installed.

Figure 23:
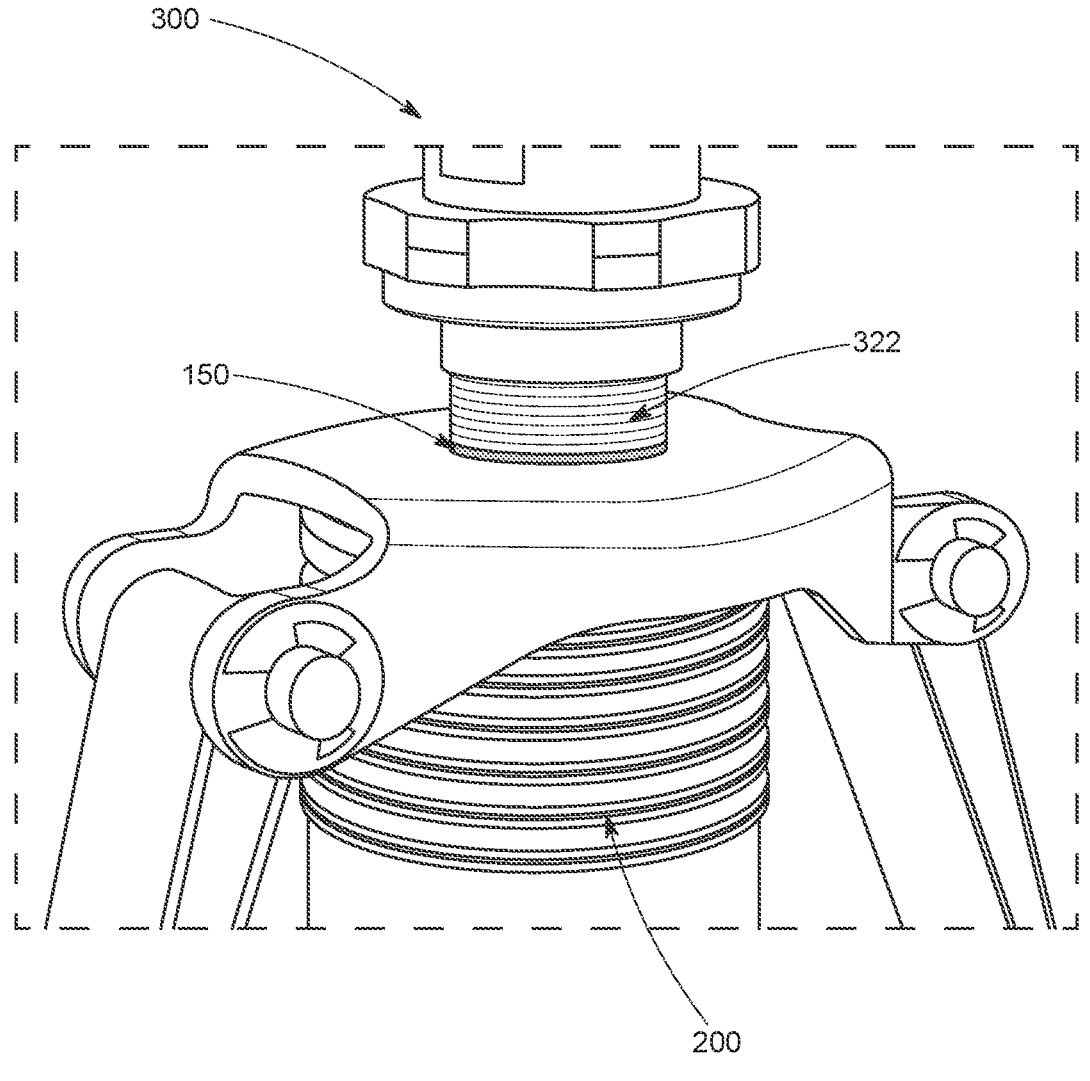
FIG. 23 is a diagrammatic view illustrating a physical marking to indicate proper installation of the field device mount shown in FIG. 15.

FIG. 23 is a diagrammatic view of a field device mount in accordance with an embodiment of the present invention. FIG. 23 shows an important feature for proper installation that will ensure full benefit of the tension features in field device mount 300, as a minimum torque or force is required on the disc springs 200. Most industrial banding tools and applications do not require a specific installation torque or force and known banding tools do not have indicators for levels of torque or force. In order to provide a specific amount of force, embodiments provided herein, may include a physical marking 150 located on the stem 322 or inline tensioner 106 (shown in FIG. 5B) to indicate proper tension/spring compression. A marking can be calculated based on the spring force and correlated to a selected amount of compression in the bias member. For example, the marking may correlate to a compression of a disc spring for ideal installations.

Figure 16:
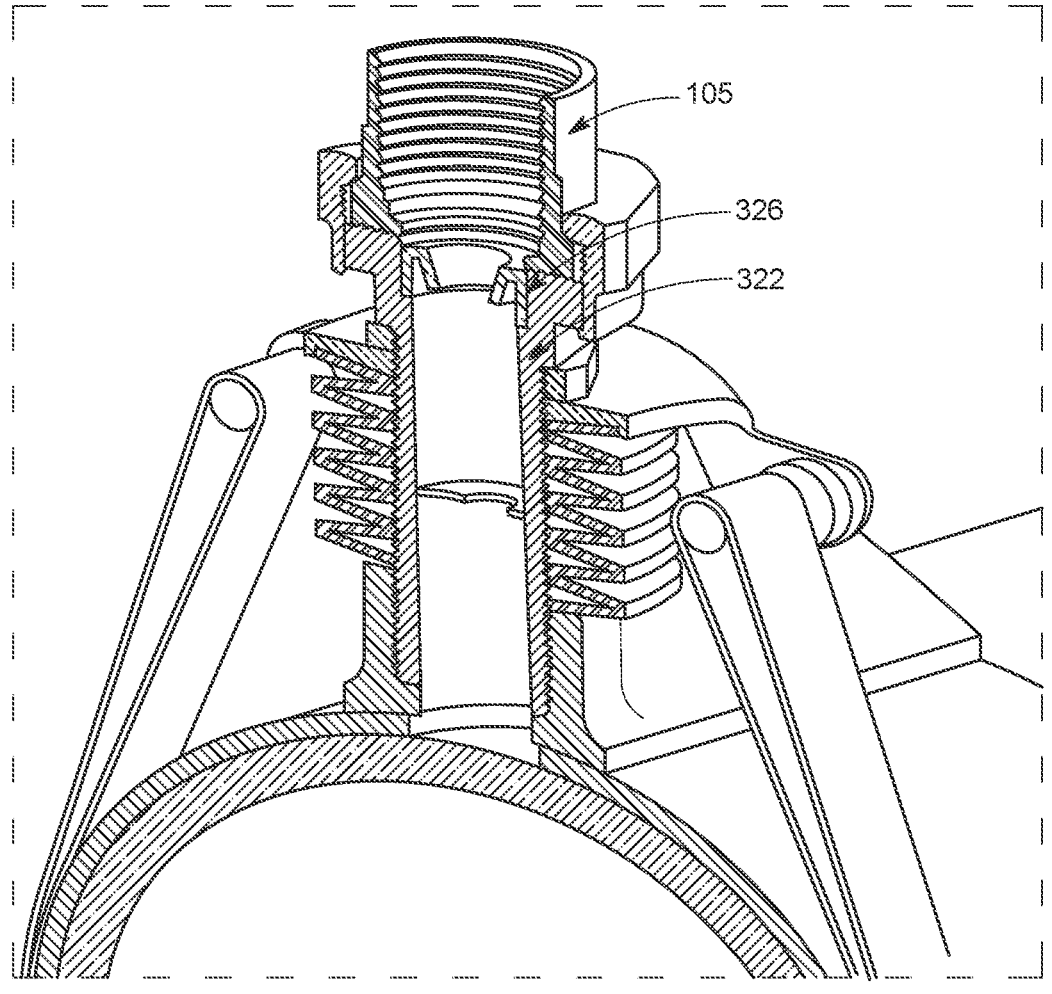
FIG. 16 is a diagrammatic cross-sectional view of a field device mount in accordance with an embodiment of the present invention.

FIG. 16 is a diagrammatic cross-sectional view of a field device mount in accordance with an embodiment of the present invention. FIG. 16 shows an important feature in the form of seal 326. Seal 326, when used in combination with embodiments described above, is achieved by a cylindrical seal (i.e., a wiper seal) that receives the temperature sensor, located at the union 105 end of the stem 322 that will prevent ingress into the field device and enclosure. A person skilled in the art may utilize alternative seal designs for providing ingress protection to the field device. Seal 326 allows the field device mount to be installed in orientations such as below a pipe where the potential of standing water inside the clamp foot is possible without drainage. Seal 326 allows the assembly to maintain ingress protection.

Figure 17:
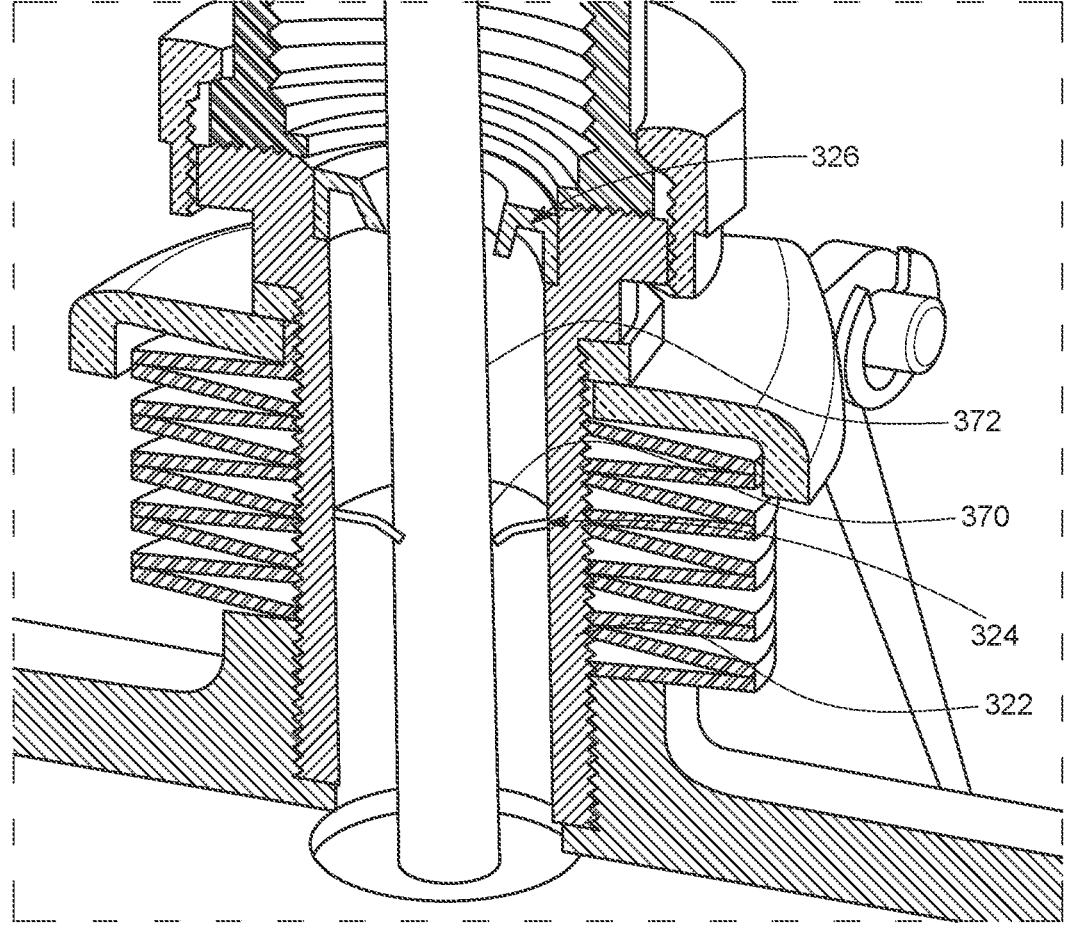
FIG. 17 is an enlarged diagrammatic view of a portion of a field device mount in accordance with an embodiment of the present invention.

FIG. 17 is an enlarged diagrammatic view of a portion of a field device mount in accordance with an embodiment of the present invention. As shown in FIG. 17, as an enhancement, a field device mount preferably includes centering feature 324, which includes an aperture 370 that is configured to receive temperature sensor 372 and center temperature sensor 372 within stem 322. As designed, the centering insert is installed into stem 322 and is held by expanding into an internal groove within stem 322. Centering feature 324 is used to align and center temperature sensor 372 for improved surface contact, which is needed to ensure consistent heat transfer into the sensor tip and a more accurate temperature measurement. FIG. 17 also shows the operation of seal 326 sealing against the outer diameter of temperature sensor 372.

Figure 18:
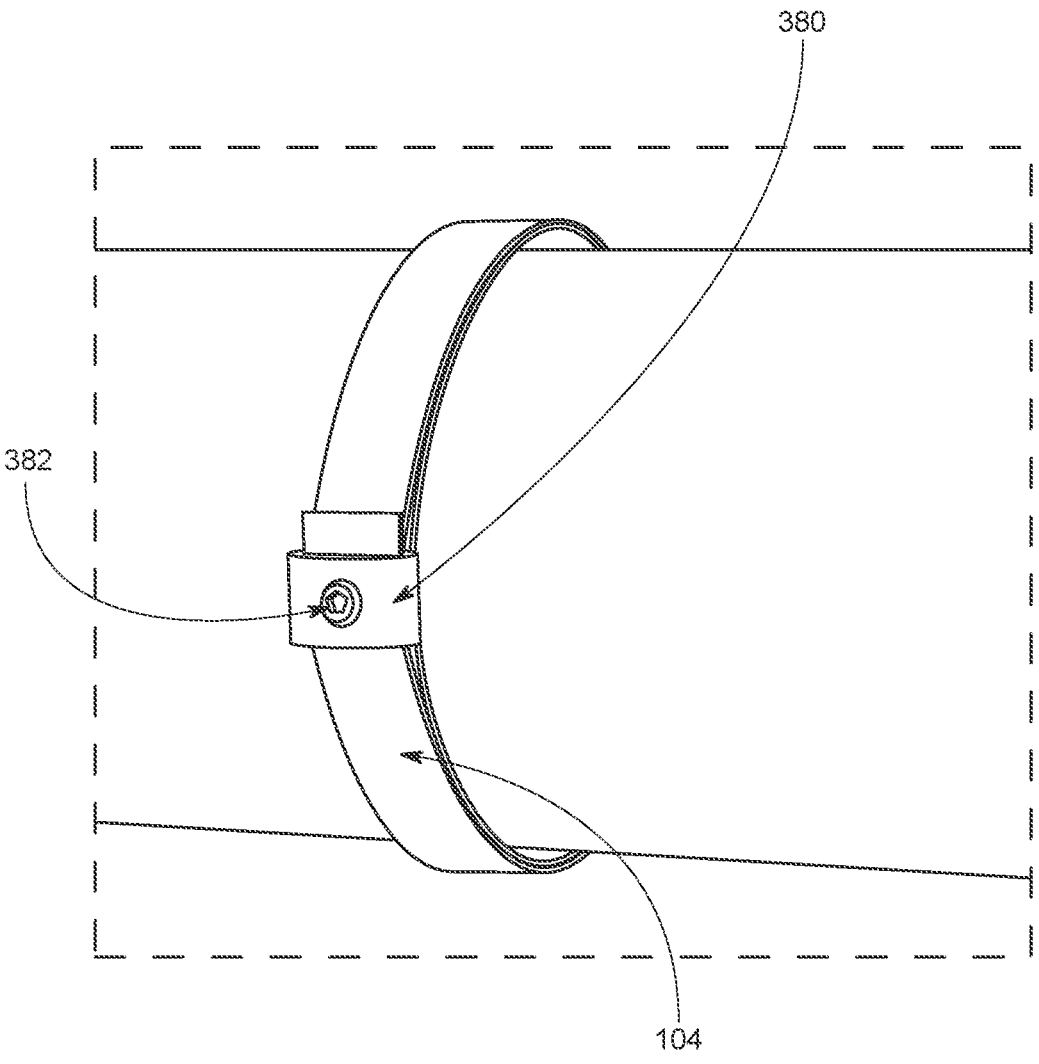
FIG. 18 is a diagrammatic view of a buckle for use in combination with embodiments of the present invention.

FIG. 18 is a diagrammatic view of a buckle for use in combination with embodiments of the present invention. Buckle 380 may be used in conjunction with any or all of the various embodiments described herein. Buckle 380 is preferably a formed piece and includes a set screw 382. Securing the banding is done by torquing set screw 382 through the formed buckle 380 and onto the banding 104. Cup point set screws are preferably used, while knurled cup points and other types may be applicable to provide increased clamping load. By utilizing a set screw to hold the banding in place, the same banding can be tensioned multiple times and can be tensioned to fit multiple line sizes. A person skilled in the art may also utilize alternative buckle designs as secure attachment method for banding 104.

Figure 19:
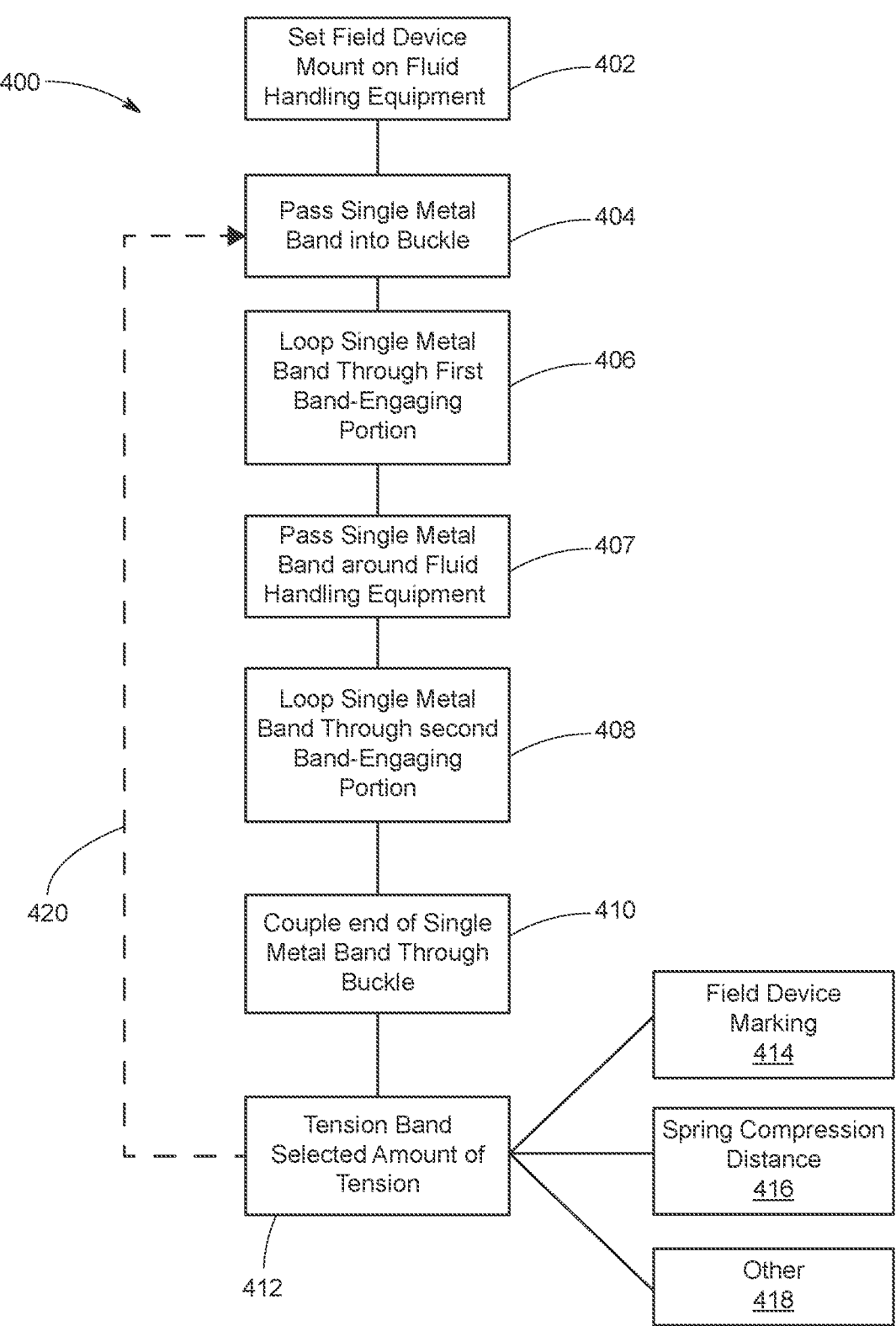
FIG. 19 is a flow diagram of a method of mounting a field device in accordance with an embodiment of the present invention.

FIG. 19 is a flow diagram of a method of mounting a field device in accordance with an embodiment of the present invention. Method 400 begins at block 402, where a field device mount is set upon fluid handling equipment. Next, at block 404, a single band is passed into a buckle. The buckle may be a known buckle used for standard banding processes, or may be an alternative buckle, such as one that allows the easy removal of a set screw to release the banding. At block 406, the single band is looped over a first band engaging portion of a tensioner assembly, such as a perpendicular tensioner assembly. At block 407, the single band is then passed around the fluid handling equipment to which the field device is to be mounted. Once the single band has passed around the fluid handling equipment, it is looped through a second band engaging portion of the tensioner assembly, as indicated at block 408. Next, the end of the single band is passed through the buckle again, as indicated at block 410. At block 412, the band is tensioned until a selected amount of tension is achieved, as indicated at block 412. The selected amount of tension may be indicated by a marking on the field device mount, as indicated at block 414, or by measuring spring compression, as indicated at block 416. Other forms of determining the correct amount of tension can also be used, as indicated at block 418. If an additional band is to be applied, such as in the embodiment illustrated with respect to FIG. 2, method 400 will repeat for the next band, as indicated at dashed line 420. Method 400 can be practiced with a field device coupled to the field device mount as method 400 is performed or may be coupled to the field device after method 400 has been completed.

Figure 20:
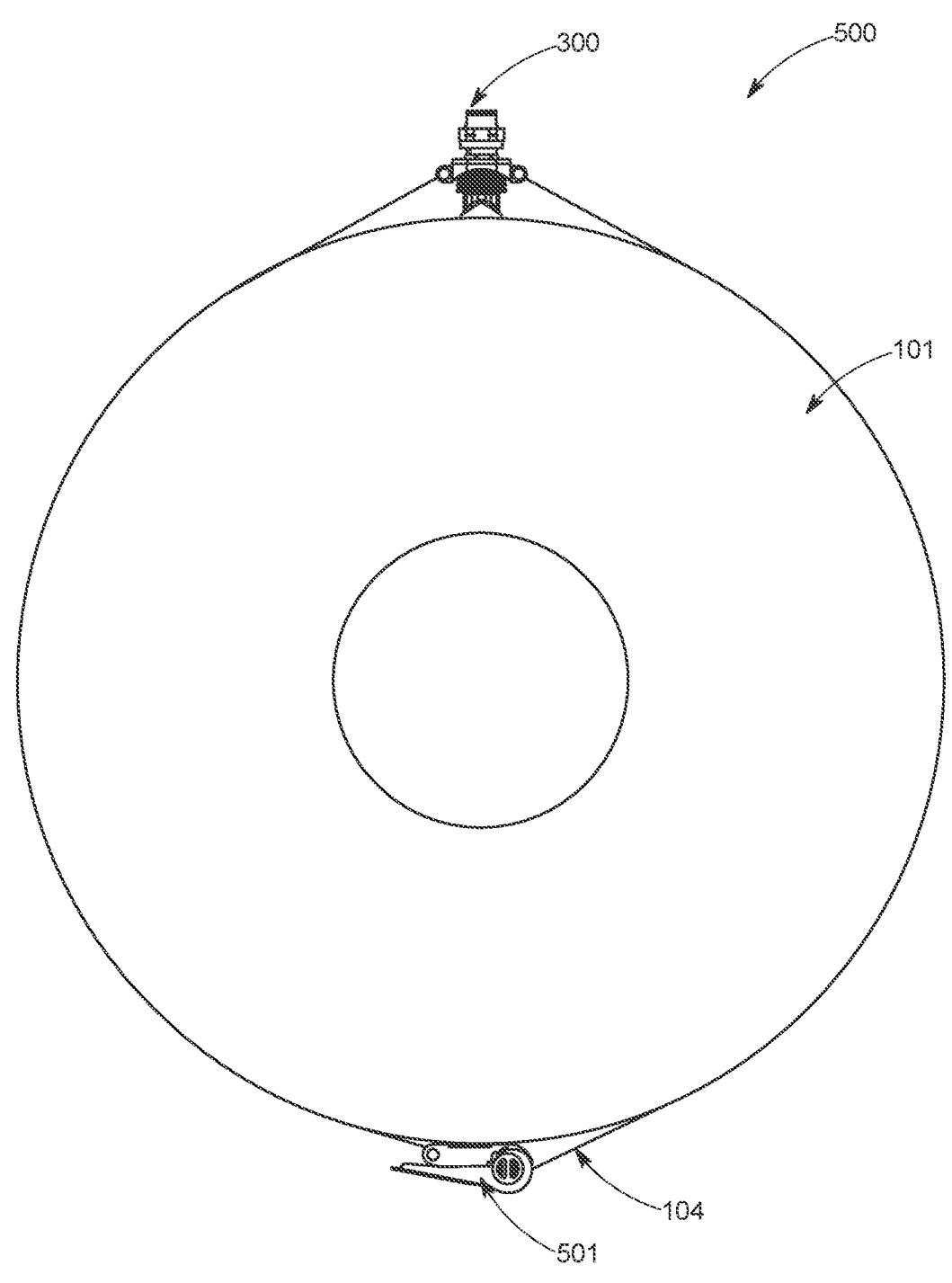
FIG. 20 is a diagrammatic view of a field device mount in accordance with another embodiment of the present invention.

FIG. 20 is a diagrammatic view of a field device mount in accordance with another embodiment of the present invention. Field device mount 500 includes a perpendicular tensioner assembly, as described above, with a combination buckle-tensioning mechanism 501. In this embodiment, the tensioning mechanism is a ratchet type device within the combined buckle-tensioning mechanism. Using the buckle-tensioning mechanism 501, the band 104 tension is increased until a marker or suitable indication of tension is shown on field device mount 500. The ratchet-based embodiment will work well with large fluid handling equipment 101, including large pipe line sizes, tanks, as well as irregularly-shaped vessels. The benefit of the ratchet-type tensioning mechanism is that the field device mount has built in tensioning instead of needing to have an additional tensioning device to secure banding 104.

Figure 21:
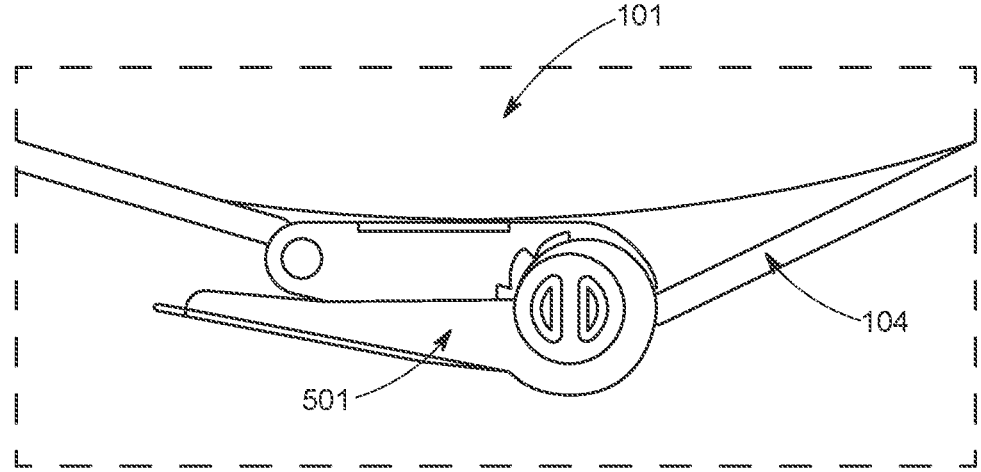
FIG. 21 is an enlarged view of the field device mount shown in FIG. 20.

FIG. 21 is an enlarged view of the field device in accordance with an embodiment of the present invention shown in FIG. 20. In the illustrated example, the embodiment shows the engagement of the buckle-tensioning mechanism 501 as the combination of a buckle and a ratcheting-type device in contact with the fluid handling equipment 101. The buckle-tensioning mechanism 501 allows field device mount 300 (not shown) to be installed without the need of a banding tensioning tool as it has the built-in ratchet functionality, which tensions the banding 104.

Figure 22:
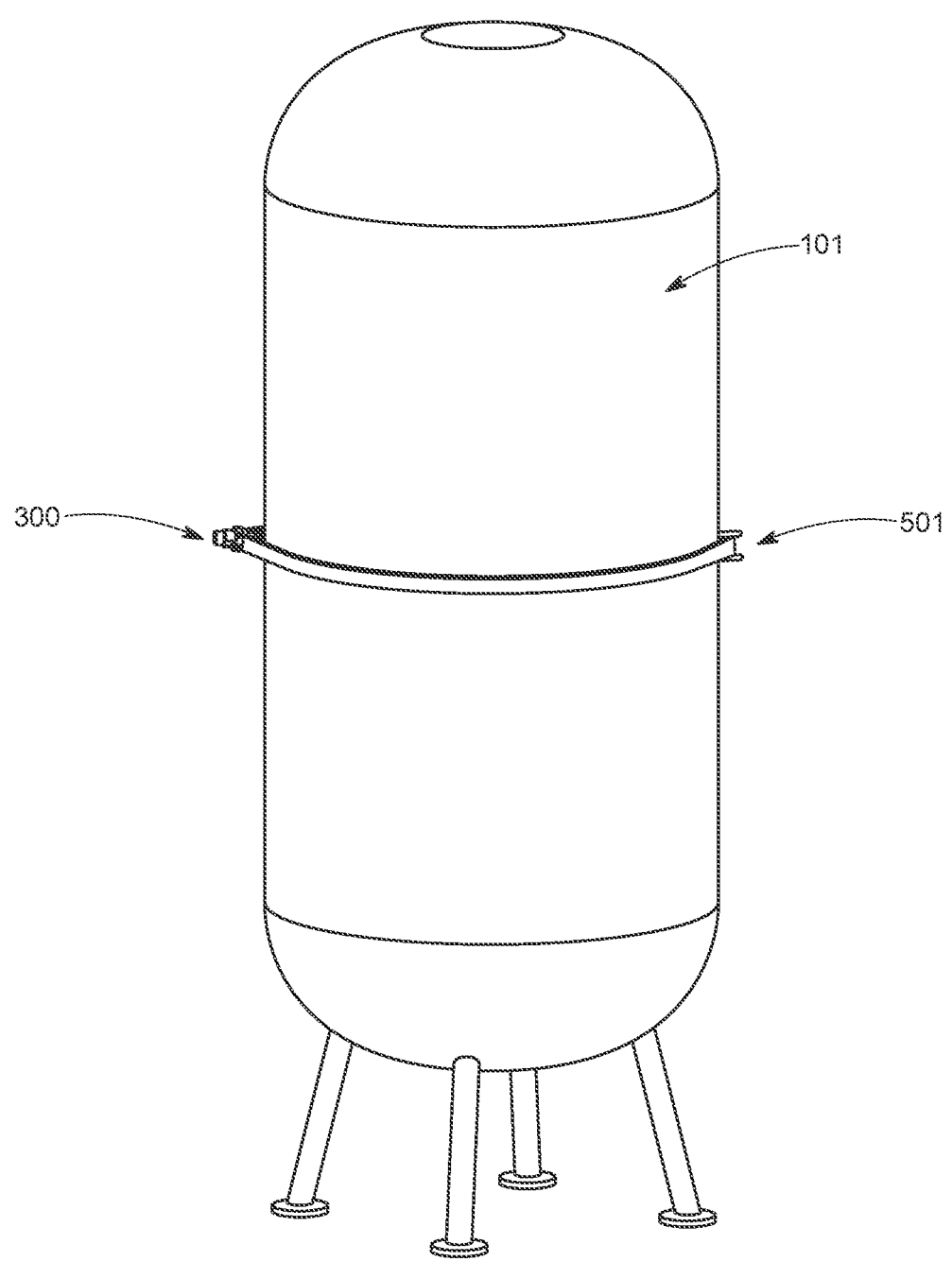
FIG. 22 is a diagrammatic view of a field device mount in accordance with another embodiment of the present invention.

FIG. 22 is a diagrammatic view of a field device mount in accordance with another embodiment of the present invention. FIG. 22 shows the field device mount 300 assembled to a large fluid handling equipment 101 utilizing the ratchet-type buckle-tensioning mechanism 501.

Although the present invention has been described with reference to preferred embodiments, workers skilled in the art will recognize that changes may be made in form and detail without departing from the spirit and scope of the invention.

What is claimed is:

1. A field device mount comprising:
   a threaded union configured to couple to a field device and mount the field device while the field device operates in a process installation;
   a clamp foot coupled to the union, the clamp foot being configured to engage fluid handling equipment;
   a tensioner assembly coupled to the clamp foot and having a tensioner bracket;
   a biasing member disposed to urge the tensioner bracket away from the clamp foot;
   a band configured to pass around the fluid handling equipment and to couple to opposite sides of the tensioner bracket;
   a buckle configured to be coupled to the band and provide clamping force to maintain tension in the band; and
   a jamb nut engaged to drive the tensioner bracket into the biasing member to reduce tension on the band.

2. The field device mount of claim 1, wherein the buckle is configured to receive opposite ends of the band.

3. The field device mount of claim 2, wherein the band is configured to loop around respective band engaging portions on opposite sides of the tensioner bracket.

4. The field device mount of claim 1, wherein the biasing member is a compression spring.

5. The field device mount of claim 1, wherein the tensioner bracket includes a pair of opposite sidewalls spaced apart to receive an outer diameter of the biasing member.

6. The field device mount of claim 1, wherein the clamp foot includes a chevron-shaped profile.

7. The field device mount of claim 1, wherein the buckle is a formed piece and includes a set screw.

* * * * *